US006277230B1

(12) United States Patent
Milko

(10) Patent No.: US 6,277,230 B1
(45) Date of Patent: Aug. 21, 2001

(54) METHOD AND SYSTEM FOR EFFICIENTLY USING MEDIA THAT CAN BE STAMPED ON A SUBSTRATE

(75) Inventor: Dusan Milko, New Windsor, NY (US)

(73) Assignee: VITS-America, Inc., Blauvelt, NY (US)

( * ) Notice: Subject to any disclaimer, the term of this patent is extended or adjusted under 35 U.S.C. 154(b) by 0 days.

(21) Appl. No.: 09/411,443

(22) Filed: Oct. 1, 1999

(51) Int. Cl.[7] .......................... B44C 1/165; B32B 31/20; B65H 26/00; B41M 3/12

(52) U.S. Cl. .......................... 156/230; 156/234; 156/238; 156/240; 156/247; 156/289; 156/64; 156/361; 156/540; 427/147; 428/914

(58) Field of Search .................................... 156/230, 233, 156/238, 240, 241, 247, 277, 289, 351, 64, 357, 361, 540, 541, 553, 209, 220; 427/146, 147, 148, 208.2; 428/914

(56) References Cited

U.S. PATENT DOCUMENTS

| | | | | |
|---|---|---|---|---|
| 5,115,737 | * | 5/1992 | Amendola | 101/32 |
| 5,207,855 | | 5/1993 | Nyfeler et al. | 156/351 |
| 5,464,690 | | 11/1995 | Boswell | 428/334 |
| 5,486,254 | * | 1/1996 | Gallagher et al. | 156/229 |

FOREIGN PATENT DOCUMENTS

| | | | | |
|---|---|---|---|---|
| 2254586 A | * | 10/1992 | (GB) | B41F/19/06 |
| WO 98/12051 | * | 5/1998 | (WO) | B41F/19/06 |

* cited by examiner

*Primary Examiner*—Mark A. Osele
*Assistant Examiner*—J. A. Lorengo
(74) *Attorney, Agent, or Firm*—Kenyon & Kenyon

(57) ABSTRACT

A method and a system for efficiently using media stamped on a substrate include a feedroller, a shuttle, a cylinder and a control arrangement. The media has at least one registration mark. The feedroller is coupled to the media and provides the media with a first velocity component. A shuttle is coupled to the feedroller via the media and moves linearly with a variable periodic velocity. The shuttle provides the media with a second velocity component, the second velocity component being a function of the velocity of the shuttle. A cylinder has at least one die and a stamping area in which one of the at least one die urges the media against a substrate. The media and the substrate have same velocity in the stamping area during the urging, but the substrate has a greater average velocity than an average velocity of the media. A control arrangement is coupled to the feedroller, the shuttle and the cylinder. The control arrangement maintains a registration between the media and substrate. The control arrangement detects a position of at least one of the at least one registration mark, the feedroller and the cylinder and modifies a gear ratio to reduce errors in the registration based upon the detected position. The gear ratio represents a ratio between a cycle on the media and a cycle on the substrate.

8 Claims, 7 Drawing Sheets standard die divided die standard die (process with IFF)

divided die (process with IFF)

METHOD AND SYSTEM FOR EFFICIENTLY USING MEDIA THAT CAN BE STAMPED ON A SUBSTRATE

FIELD OF THE INVENTION

The present invention generally relates to a method and a system for efficiently using media that can be stamped on a substrate.

BACKGROUND INFORMATION

Conventional stamping machines and processes are carried out on a moving web including a preprinted substrate material. To add design, security, or informational elements that are part of a completed web, a decal or section of foil constituting such an element is stamped out of the foil onto the web at defined locations. The stamping operation is typically accomplished by means of a rotary stamper that is provided with a die mounted onto its outer surface. The die comes into contact with a separate foil tape bearing the decals or design elements that are to be transferred, and transfers one such element to the substrate web by pressing down on it against the web. In some operations, heat may be applied to achieve the desired effect.

A disadvantage of such a process lies with the expense of the foil tape. The tape is often very expensive in relation to the underlying substrate, and therefore adds disproportionately to the overall cost of the competed web. Costs become accentuated as end-users process expensive tapes such as holograms and other metallic decals onto the material with which their product is packaged. Typically, the decal stamped from the tape onto the substrate web occupies only a very small fraction of the length of each individually completed design on the substrate. In the area at which the foil is stamped, the foil preferably has a velocity that matches the velocity of the facing web so as to properly register with the web. A conventional method of assuring such a match in velocities includes the step of feeding the foil through the apparatus and to the stamping area at a uniform velocity equal to the velocity of the web. However, the so-called continuous feed approach inevitably wastes most of the foil, for only that portion of the foil that registers with the die when the die cycles over the desired section of the web is ever used. The remainder of the foil is discarded as waste.

Various schemes have been proposed to make more efficient use of the foil. Generally speaking, they all present some structural arrangement by which the speed of the foil at the die is altered between the web velocity, at which the foil can most easily be stamped and registered onto the web substrate, and a lesser velocity. In other words, such arrangements aim to make better use of the foil by feeding it in an intermittent manner to the die area, as opposed to the continuous feed arrangement described above. Conventional means for accomplishing intermittent feed employ a rotary stepper motor to pivot a rocker arrangement about which the tape is wound. The rotary movement of the rocker arms imparts a component of velocity to the foil wound about the rocker arms. Unfortunately, the use of rotary motion to control the linear position of a moving foil presents errors and uncertainties in the position of the foil that exacerbates the problem of registration between the foil and the substrate web, which is of utmost importance in many applications. Also, the use of such structure adds to the maintenance costs of the apparatus.

There remains a need for a foil stamping apparatus that makes efficient use of the foil and that provides enhanced registration capabilities.

SUMMARY OF THE INVENTION

The present invention provides a system for efficiently using a media that can be stamped on a substrate. The system includes a feedroller, a shuttle, a cylinder and a control arrangement. The media has at least one registration mark. The feedroller is coupled to the media and provides the media with a first velocity component. The shuttle is coupled to the feedroller via the media and moves linearly with a variable periodic velocity. The shuttle provides the media with a second velocity component, the second velocity component being a function of the velocity of the shuttle. The cylinder has at least one die and a stamping area in which one of the at least one die urges the media against a substrate. The media and the substrate have same velocity in the stamping area during the urging, but the substrate has a greater average velocity than an average velocity of the media. The control arrangement is coupled to the feedroller, the shuttle and the cylinder. The control arrangement maintains a registration between the media and substrate. The control arrangement detects a position of at least one of the at least one registration mark, the feedroller and the cylinder and modifies a gear ratio to reduce errors in the registration based upon the detected position. The gear ratio represents a ratio between a cycle on the media and a cycle on the substrate.

The present invention provides a method for efficiently using media that can be stamped on a substrate. The method includes the steps of providing the media with a first velocity component from a feedroller; providing the media with a second velocity component that is a function of a velocity of a shuttle, the shuttle moving linearly with the velocity being variable and periodic; urging the media against a substrate, the media and the substrate having same velocity in a stamping area of a cylinder with at least one die, the substrate having a greater average velocity than an average velocity of the media; and maintaining a registration between the media and the substrate via a control arrangement by detecting a position of at least one of at least one registration mark on the media, the feedroller and the cylinder and by modifying a gear ratio to reduce errors in the registration based upon the detected position, the gear ratio representing a ratio between a cycle on the media and a cycle on the substrate.

The present invention also provides a method of maintaining a registration between a media and a substrate in a system for efficiently using media that can be stamped on a substrate. The system including a feedroller, a shuttle and a cylinder. The feedroller is coupled to the media, the feedroller providing the media with a first velocity component. The shuttle is coupled to the feedroller via the media, the shuttle moving linearly with a variable periodic velocity. The shuttle provides the media with a second velocity component, the second velocity component being a function of the velocity of the shuttle. The cylinder has at least one die and a stamping area in which one of the at least one die urges the media against the substrate. The media and the substrate have the same velocity in the stamping area, but the substrate has a greater average velocity than an average velocity of the media. The method includes the steps of detecting a position of at least one of at least one registration mark on the media, a feedroller and a cylinder; and modifying a gear ratio to reduce errors in the registration based upon the detected position, the gear ratio representing a ratio between a cycle on the media and a cycle on the substrate.

DETAILED DESCRIPTION

Figure 1A:
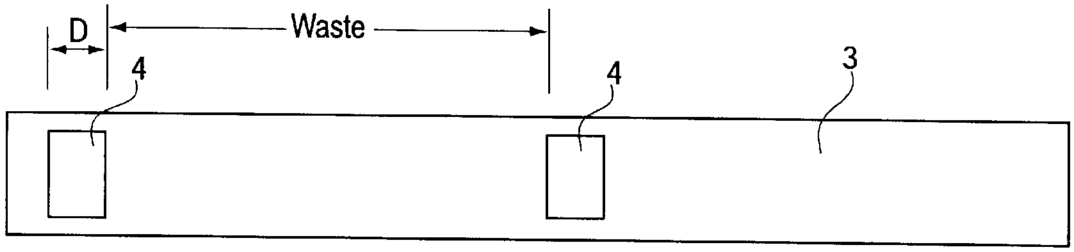
FIG. 1A illustrates a length of foil with die patterns.
Figure 1B:
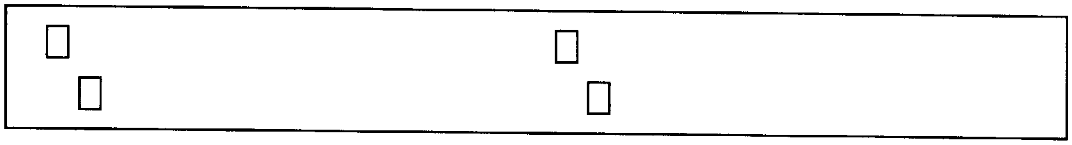
FIG. 1B illustrates the length of the foil with divided die patterns.

FIG. 1A illustrates a length of foil 3 with two die patterns 4. Each die pattern 4 has a die size D. The foil 3 that is between the two die patterns 4 is wasted foil characterized by a width W. FIG. 1B illustrates a similar foil tape 3 with two die patterns 4 stamped out and characterized by the same die size D and the same waste W, except that each of the two die patterns 4 is a divided die pattern.

Figure 1C:
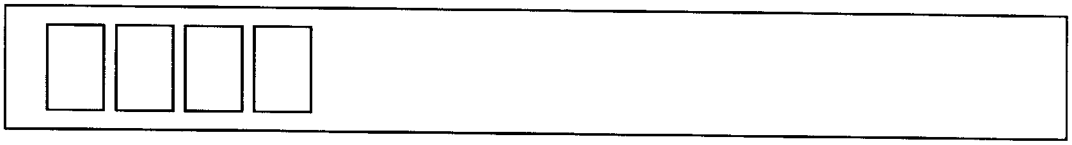
FIG. 1C illustrates the length of the foil with die patterns generated by feeding the foil incrementally according to the present invention.
Figure 1D:
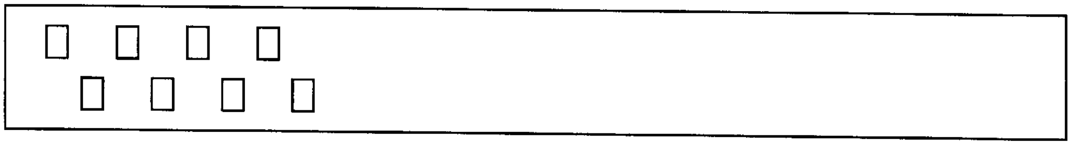
FIG. 1D illustrates the length of the foil with divided die patterns generated by feeding the foil incrementally according to the present invention.

As illustrated in FIGS. 1C and 1D, the present invention reduces the amount of foil tape 3 wasted by conventional stamping machines in which, for example, the foil may have been continuously fed past a die at a constant speed equal to the speed of an underlying web substrate. By incrementally feeding foil to the die of the present invention, the waste W is lessened and the foil 3 is more efficiently utilized. FIGS. 1C and 1D further illustrate that the present invention is applicable to divided and/or undivided die patterns 4.

Figure 2:
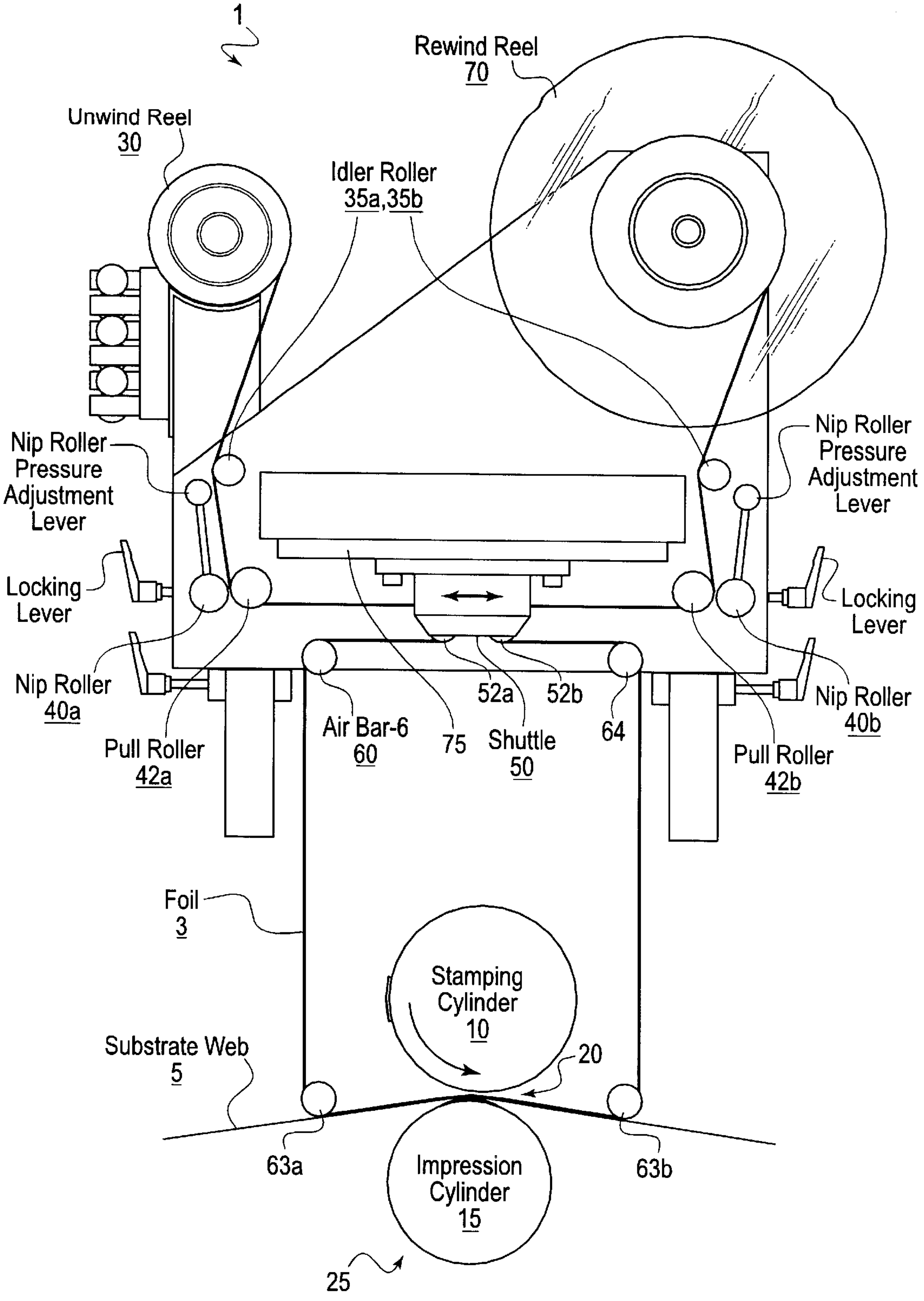
FIG. 2 illustrates an embodiment of a system for efficiently using foil according to the present invention.

FIG. 2 illustrates an embodiment of a system I for efficiently using foil that can be stamped on a substrate, for example, in a stamping apparatus according to the present invention. The system 1 includes a rotatable stamping cylinder 10 and a rotatable impression cylinder 15. The rotatable stamping cylinder 10 is disposed above the rotatable impression cylinder 15 such that the foil tape 3 (typically bearing continuous metal leaf or discrete decals) and a substrate web 5 (e.g., paper), which are arranged, in part, in superposition with respect to one another, can be moved between a nip 20 defined by a gap between the stamping cylinder 10 and the impression cylinder 15. On the outer circumferential surface of the stamping cylinder 10 is affixed at least one raised die 12. The die 12 is positioned such that when the die 12 is rotated to a position near the nip 20, the die 12 begins to contact the foil tape 3 and urges the foil 3 against the substrate web 5 and the impression cylinder 15 to transfer, for example, metal leaf or decals from the foil 3 onto the substrate web 5.

The substrate web 5 is passed over the impression cylinder 15 of the stamping station 25 at a generally constant production velocity of value Vc by conventional means that need not be further explained. The foil 3 is fed to the stamping station 25 (an area where the stamping cylinder 10 approximately faces the impression cylinder 15) from an unwind reel 30 (that is not driven) as follows. From the unwind reel 30, the foil 3 is threaded past an idler roller **35*a* to a nip in an arrangement including a nip roller 40*a*, a feed roller 42*a* arrangement, and means for adjusting the nip roller pressure on the foil 3. The feed roller 42*a* is driven and pulls the tape 3 off the unwind reel at a constant rate. The foil 3 is subsequently threaded around a roller 52*a* in a shuttle 50, and then around an air bar 60. Next, the foil 3 moves to a pair of rollers including a first roller 63*a* disposed upstream of the stamping station 25 and a second roller 63*b* disposed downstream of the stamping station 25. The rollers 63*a*, 63*b* direct the foil 3 so that the foil 3 abuts a length of the substrate web 5 in an area near where the die 12 presses down on the web 5** when rotated into that position.

The foil 3 continues downstream of the stamping station 25 to a further roller 64 that redirects the foil 3 back to the shuttle 50 in which the foil 3 winds around another roller **52*b* before exiting the shuttle 50 into a nip of an arrangement including a second feed roller 42*b*, a second nip roller 40*b*, and a further means for adjusting the nip roller pressure on the foil 3. The arrangement pulling the foil 3 forward and adjusting the pressure applied to the foil 3. The second feed roller 42*b* may have a somewhat larger diameter than the first feed roller 42*a* (typically by approximately 0.003 inches), so as to impart a degree of tension onto the foil 3. Subsequently, the foil 3 moves past an idler roller 35*b* to a reewind or take-up reel 70 (which, similar to the unwind reel 30, is provided with a magnetic clutch), onto which the foil 3 is stored. Both of the feed rollers 42*a*, 42*b* are driven at an identical rotational velocity by a single servomotor, which also drives the take-up reel 70**.

The stamping cylinder 10 rotates with a tangential component of velocity of value Va at the surface of the die 12 that is substantially equal to value Vc, the velocity of the substrate web 5, so that it does not slip with respect to the web 5. To achieve proper registration of the foil 3 with respect to the web 5, the velocity of the foil 3 should match the velocity of the web 5 at the time and in the area that the die 12 comes into contact with the foil 3 and the web 5. If the velocity values Va, Vc substantially differ, there may be slippage and, consequently, an improper registration. On the other hand, if the substantially matched velocity values Va, Vc are maintained throughout the entire duty cycle of the web 5, then much of the foil 3 will be wasted.

The shuttle 50 minimizes foil waste by adding a component of velocity to the foil 3 at the stamping area that can vary the instantaneous velocity of the foil 3 from velocity value Va, when stamping occurs, to a lesser velocity value Vb, which may even be a negative velocity. In FIG. 2, the shuttle 50 moves in a linear fashion left to right or right to left. Whether the value of the velocity of the foil 3 at the stamping cylinder 25 is Va or Vb, depends upon whether the shuttle 50 is moving to the left or to the right. Moving in one direction, the shuttle 50 imparts a positive, velocity component of maximum velocity value Vs to the foil 3; moving in the opposite direction, the shuttle 50 imparts a negative velocity component of maximum velocity value, –Vs, to the foil 3. The shuttle 50 also provides a suitable and timely positive or negative acceleration between extreme velocity values Va, Vb as called for by the duty cycle of the substrate web pattern and the movement of the die 12.

Figure 3:
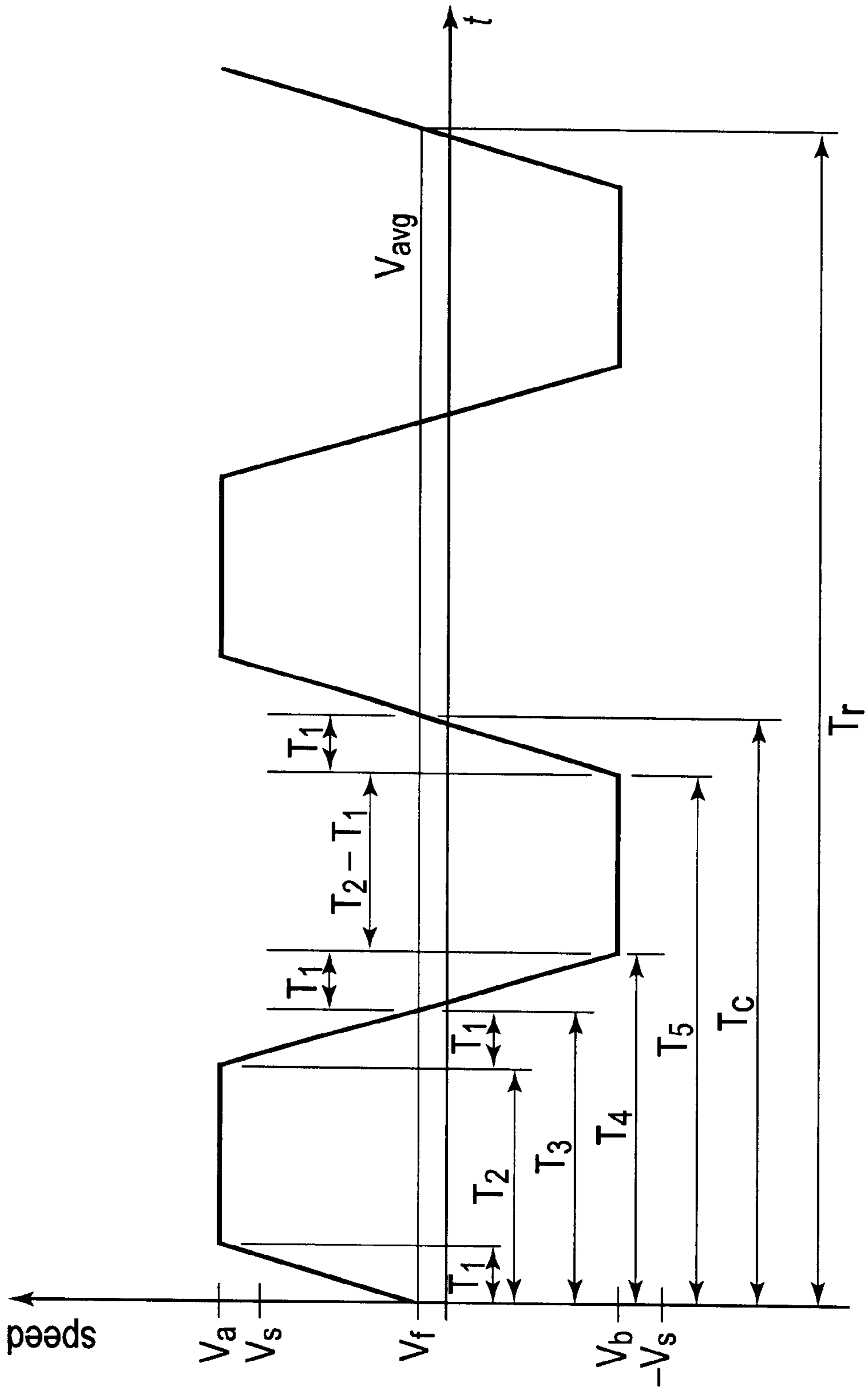
FIG. 3 is a plot illustrating foil velocity in a stamping area as a function of time according to the present invention.

FIG. 3 is a plot illustrating the velocity of the foil 3 in the stamping area as a function of time. In this example, the stamping cylinder 10 has two dies 12 affixed to its outer circumferential surface. The two dies 12 are approximately 180° apart. The time period Tc is the time period for one master cycle (i.e., the time period to complete one stamping cycle). The time period Tr is the time period for one complete revolution of the stamping cylinder 10. Since there are two master cycles for each revolution of the stamping cylinder 10, the time period Tr is twice as long as the time period Tc. Generally, Tc Tr=Nd, where Nd is the number of dies on stamping cylinder 12.

The velocity value Vf represents the forward foil speed on the feed roller 42*a*. The forward foil speed Vf is substantially constant. In a first time interval [0, T1], the shuttle 50 begins its linear motion by accelerating in one direction to increase the shuttle speed up to Vs. The shuttle speed is, in this case, added to the forward foil speed Vf. During this time interval, the velocity of the foil 3 in the stamping area starts at a value of Vf and increases linearly, for example, to the value Va in which Va=Vf+Vs.

In a subsequent time interval [Ti, T2], the shuttle 50 is no longer accelerating, but is maintaining its maximum speed Vs. During this interval, the foil 3 in the stamping area has a velocity of value Va which is substantially equal to the velocity value Vc of the web 5. Conditions in this interval are advantageous for stamping the moving foil 3 onto the moving web 5.

In a next time interval [T2, T3], the shuttle 50 negatively accelerating from a shuttle speed of Vs down to a shuttle speed of zero. During this interval, velocity of the foil 3 in the stamping area starts at a value of Va and decreases linearly, for example, to the value of Vf.

In time interval [T3, T4], the shuttle 50 begins its linear motion in an opposite direction as traveled in the time interval [0, T3] by accelerating negatively to decrease the shuttle speed down to −Vs. During this time interval, the velocity of the foil 3 in the stamping area starts at the value of Vf and decreases linearly, for example, to the value Vb in which Vb=Vf−Vs.

In a subsequent time interval [T4, T5], the shuttle 50 is no longer negatively accelerating, but is maintaining its maximum speed −Vs. During this interval, the velocity of the foil 3 is at a minimum and thus, the wasting of foil is minimized during this period. In fact, in this illustration, the velocity of the foil 3 may be negative which implies that foil 3 may be retracting with respect to the stamping area and thereby reducing the amount of wasted foil 3.

In a final interval [T5, Tc] of the first master cycle, the shuttle 50 accelerates from a shuttle speed of −Vs to a shuttle speed of zero. The velocity of the foil 3 in the stamping area increases linearly, for example, from −Vs to Vf.

Using conventional mathematical techniques, the average velocity Vavg of the foil 3 in the stamping area can be calculated. Such a calculation would reveal that, in the illustrated example, Vavg=Vf. Since the velocity of the substrate web is substantially constant at the value Vc, the average velocity of the substrate web is likewise the value Vc. The average velocity Vc of the substrate web 5 is typically substantially greater than the average velocity Vavg of the foil 3 in the stamping area because, typically, the distance between two stamps on the substrate web 5 is substantially greater than the die size. In other words, in an example of a wine label stamped with a hologram, the dimensions of the wine label are typically substantially greater than the dimensions of the hologram.

Therefore, the amount of wasted foil is reduced for at least the following reasons: First, because the average velocity Vavg of the foil 3 is smaller than that of the average web velocity Vc, less of the foil 3 is played out for each duty cycle of the substrate pattern.

A further advantage of the present invention is that the geometry of the shuttle arrangement and its corresponding drive contribute to more accurate registration than would be obtainable via a rotary arrangement. In the present invention, the shuttle 50 is driven by a linear servo motor 75. Linear servo motors are very precise, and can be readily controlled, for example, by pulse code modulation directed by a microprocessor, an inherently precise technology. Also, since the shuttle velocity component is linear and applied in a direction that is substantially parallel to the moving foil 3 at the stamping station (where precision is of greatest importance), the precise control of the velocity of the foil 3 is much easier to achieve than in the case in which rotary motions are instead imparted to the foil 3.

Figure 4:
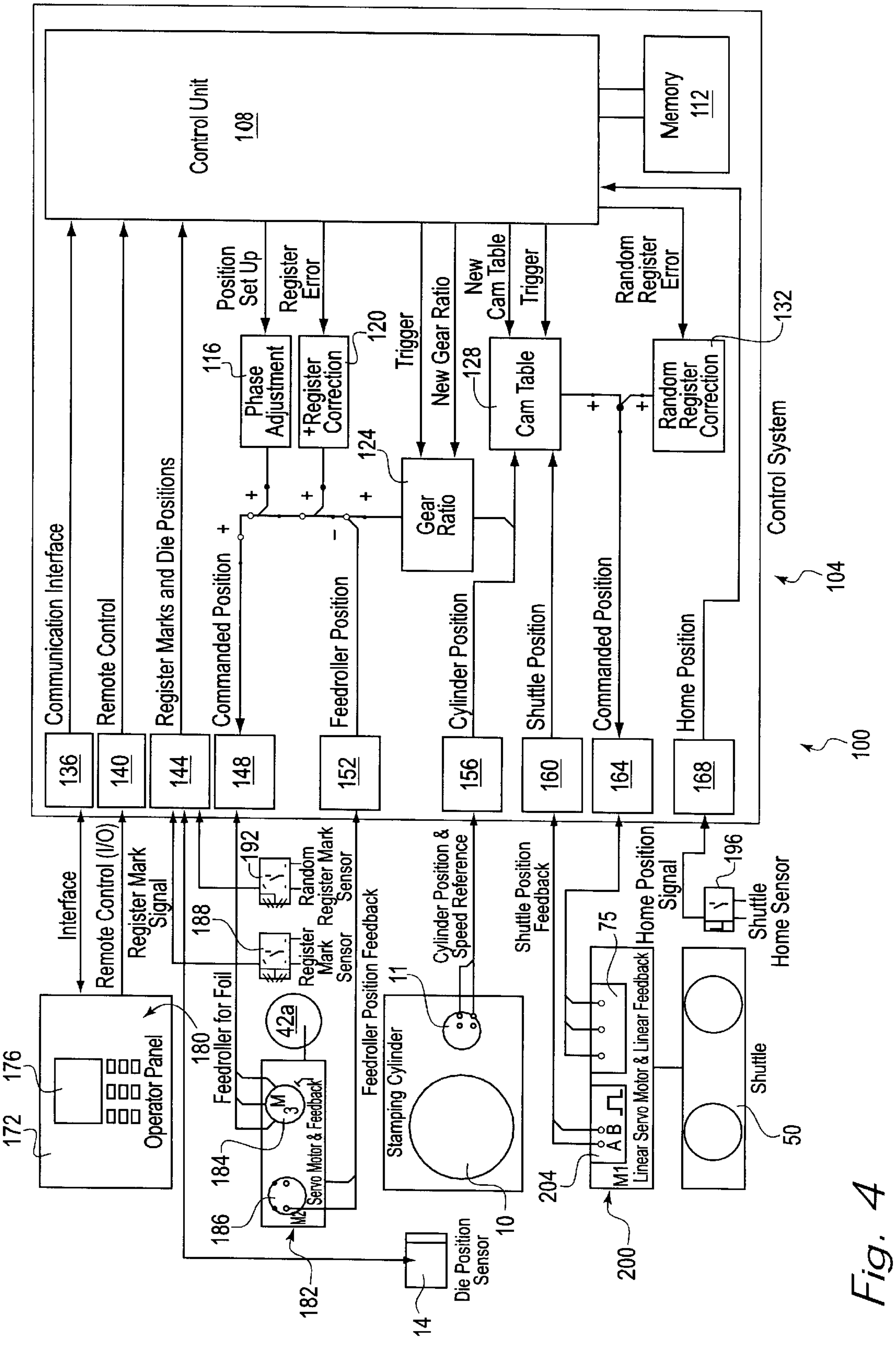
FIG. 4 is a schematic illustrating an embodiment according to the present invention of a control arrangement for use in the system for efficiently using foil.

FIG. 4 is a schematic of an embodiment according to the present invention of a control arrangement 100 for use in the system for efficiently using foil, for example, in a stamping apparatus. The control arrangement 100 includes a control system 104. The control system 104 includes a control unit 108 (e.g., a microprocessor) coupled to a memory storage device 112. The control unit 108 is coupled to a phase adjustment module 116, a register correction module 120, a gear ratio module 124, a cam table module 128 and a random register correction module 132. The control system 104 further includes a communication interface 136, a remote control interface 140, a register marks and die positions interface 144, a first commanded position interface 148, a feedroller position interface 152, a cylinder position interface 156, a shuttle position interface 160, a second commanded position interface 164 and a home position interface 168. The communication interface 136, the remote control interface 140, the register marks and die positions interface 144 and the home position interface 168 are each individually coupled to the control unit 108. The phase adjustment module 116, the register correction module 120 and the gear ratio module 125 are coupled to each other and coupled to the first commanded position interface 148. The feedroller position interface 142 is coupled to the phase adjustment module 116, the register correction module 120 and the gear ratio module 125. The cylinder position interface 160 is coupled to the gear ratio module 124 and to the cam table module 128. The shuttle position interface 160 is coupled to the cam table module 128. The cam table module 128 and the random register correction module 132 are both coupled to the second commanded position interface 164.

An operator panel 172 includes a display 176 (e.g., a graphical user interface) and a keypad 180. The operator panel 172 is coupled to the communication interface 136 and to the remote control interface 140.

The feedroller 42*a* is coupled to the first commanded position interface 148 and to a servo motor module 182. The servo motor module 182 includes a servo motor 184 and a servo motor feedback arrangement 186. The servo motor 184 drives the feedroller 42*a* and is coupled to the commanded position interface 148. The servo motor feedback arrangement 186 is coupled to the feedroller position interface 152. The feedroller 42*a* is coupled to a register mark sensor 188 and to a random register mark sensor 192. The sensors 188, 192 are coupled to the register marks and die positions interface 144.

The stamping cylinder 10 includes a stamping cylinder feedback arrangement 11, which is coupled to the cylinder position interface 156. Optionally, a die position sensor 14 is coupled to the stamping cylinder 10 and is also coupled to the register marks and die positions interface 144.

The shuttle 50 is coupled to a shuttle home sensor 196, which, in turn, is coupled to the home position interface 168. A linear servo motor module 200 is coupled to the shuttle 50.

The linear servo motor module 200 includes a linear servo motor 75 and a linear servo motor feedback arrangement 204. The linear servo motor 75 is coupled to the second commanded position interface 164. The linear servo motor feedback arrangement 204 is coupled to the shuttle position interface 160.

In operation and use, the system will be described in accordance with the present invention.

An operator enters control parameters at the operator panel 172 via the keypad 180 with the aid of prompts on the display 176. Control parameters may include data concerning the number of teeth Nr on the die cylinder gear (e.g., the gear of the stamping cylinder 10), the number of dies Nd on the stamping cylinder 10, the die size D and the waste size W. In one embodiment, a stamping cylinder gear has between 80 and 240 teeth with the teeth in approximately 0.125 inch increments. The die size D is between approximately 0.5 inches to approximately 4.0 inches. The number of dies Nd on the stamping cylinder 10 can vary between 1 and 6 Furthermore, the waste size W may vary between approximately 0.125 inches and approximately 0.750 inches, with possible overlapping for divided dies being between approximately −0.500 inches and approximately 0 inches. The control parameters enter the control system 104 via the communication interface 136 and, subsequently, are received by the control unit 108. The control unit 108 ascertains additional parameters and data from the control parameters and stores the additional parameters, data and the control parameters in the memory storage device 112.

The operator may also enter commands via the keypad 180 or through making selections on a graphical menu viewed via the display 176. Commands (e.g., reset, initialize, start new calculations or toggle commands for stamping cylinder impressing, embossing cylinder impressing, stamping cylinder heating, embossing cylinder heating) are transmitted by the operator panel 172 to the control unit 108 via the remote control interface 140. The control unit 108 can then take appropriate actions in response to the commands received in controlling for example, the stamping cylinder 10 or the shuttle 50 or the feedrollers 42.

Figure 5:
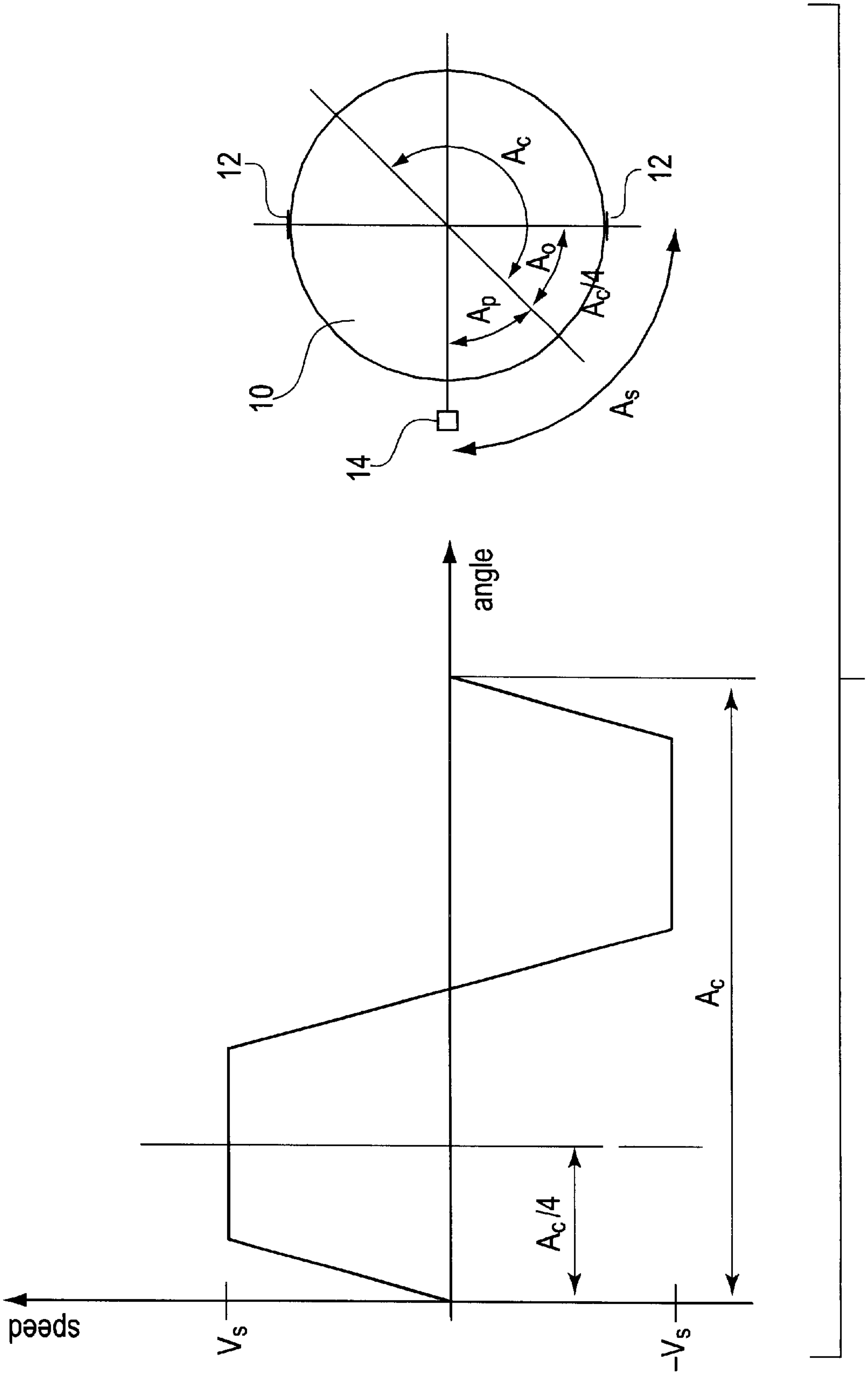
FIG. 5 illustrates setting for starting position of shuttle cycle according to the present invention.

In achieving proper registration between the foil 3 and the web substrate 5, it is advantageous to properly start the shuttle cycle. Referring to FIG. 5, the task of start point (angle) is illustrated. In the stamping cylinder 10, two dies 12 (Nd=2), for example, are equally spaced on the outer circumference of the stamping cylinder 10. The outer circumference of the stamping cylinder 10 sweeps out an angle Ar during one revolution of the stamping cylinder 10. Since the illustrated configuration has two dies 12, an angle Ac is swept during each of the two stamping cycles in which Ac=Ar/Nd. The proper starting position represented by the start offset angle Ao is one-quarter of the stamping cycle (i.e., Ac/4) from the stamping area (i.e., Ao=Ac/4=Ar/(4*Nd)). The start offset angle Ao depends upon the number Nd of dies 12 on the outer circumference of the stamping cylinder 10.

A die position sensor 14 may be positioned at a known angle As from the stamping area. In FIG. 5, the sensor 14 is illustrated as being disposed at approximately 90° from the stamping area. The dies 12 are rotated around until one of them is sensed by the sensor 14. The shuttle cycle advantageously starts when the cylinder has been moved an angle Ap after the die position sensor signal represented by the sensor angle As (i.e., Ap=As−Ao). This ensures that the stamping process occurs during the time interval in which the foil 3 and the web substrate 5 have the same speed.

If the die position sensor 14 is not employed, an operator can semi-manually place the stamping cylinder 10 in the position where the die position sensor 14 would be located if employed and send a particular command to the control unit 108 via the remote control interface 140 to simulate a die position sensor signal.

Ideally, at least one cylinder in an offline process (i.e., process in which operations may be implemented at different times on possibly different machines) or in an inline process (i.e., process in which operations performed inline step by step) is synchronized with the substrate (i.e., the cylinders' positions are properly matched with the print information on paper, for example) and remains synchronized for the duration of the offline process operations or the inline process operations. However, in practice, registration is affected by factors including environmental conditions (e.g., heat, humidity, material dimension variations) and dynamic conditions (e.g., speed variation, web slippage, stretching, shrinking). Such factors can, for example, create position variations between the print on the web substrate 5 and the tools (e.g., the at least one cylinder). Registration techniques and routines are advantageous in that they realign the tools, the web, or some combination thereof before a new operation commences. By constantly comparing, for example, the position of a registration mark to the position of the tool, a registration system may phase the tool, the web, or some combination thereof to compensate for the position difference.

In the case of an inline process, an embodiment of a registration routine according to the present invention is disclosed herein. The present invention contemplates the inline process such as, for example, a system including cylinders that are mechanically coupled by being locked together via a common line shaft. Because the process is executed inline at the same time and the cylinders are mechanically locked together via the common line shaft, the cylinders have only a phase position error compared to the print on the web 5 (i.e., a variance around a proper position).

To rectify the phase position error, a phasing or instantaneous registration routine is employed. Phasing registration maintains the proper position of the register mark to the stamping die 12. In general, the phasing registration routine carried out by the control system 104 continuously compares the expected or target position of the stamping cylinder with the position captured by the register mark sensor when the register mark on the holographic foil, for example, is detected.

Figure 6:
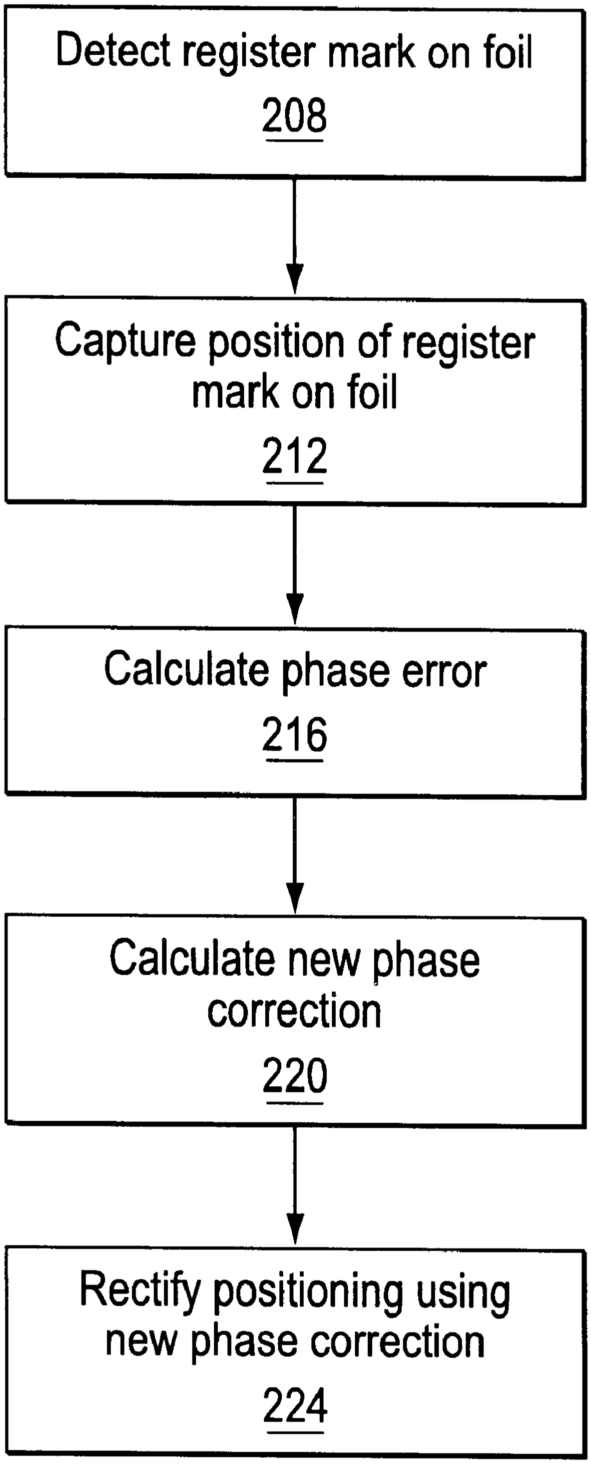
FIG. 6 is a flowchart illustrating a phasing registration routine according to the present invention.

FIG. 6 illustrates the phasing registration routine according to the present invention. In a first step 208, a register mark sensor detects the register mark on the foil 3. Subsequently, in step 212, the register mark sensor captures the position Pc of the register mark on the foil 3. The captured position Pc is transmitted to the control unit 108. The control unit 108 then compares the captured position Pc with the expected or target position Pt. In step 216, the control unit 108 calculates a phase error Rp by determining the difference between the captured position Pc and the expected position Pt. The phase error Rp corresponds to a speed ratio of 1:1 between the stamping cylinder 10 and the foil 3 (e.g., holographic foil). In step 220, a new phase correction is calculated as a function of the gear ratio Rf. In step 224, using the new phase correction, the control system 104 rectifies the positioning of the foil with respect to the stamping cylinder 10.

Gear ratios are employed to control the positioning of the foil 3 with respect to the stamping cylinder 10 by noting the relationship between the foil repeat and web repeat. Initially, the gear ratio Rf is the ratio between the distance that the foil has to move in one cycle (i.e., the die size D added to the waste size W) and the distance that the web substrate has to move in one cycle (i.e., the distance Lc between two stamps on the web 5). The error Rpf in the initial gear ratio which is useful for rectifying the ascertained phase error Rp is the product of the initial gear ratio and the phase error Rp. The control unit 108 calculates the phase error Rp, the gear ratio error Rpf, and the new gear ratio which is based upon the initial gear ratio Rf and the gear ratio error Rpf and transmit the information to the gear ratio module 124. Subsequently, the control system 104 via the commanded position interface 148 is able to adjust the relative position of the foil 3 with respect to the stamping cylinder 10.

In the case of an offline process, an embodiment of a registration routine according to the present invention is disclosed herein. The present invention contemplates the offline process such as, for example, stamping foil 3 at one time at a first cylinder and embossing the foil 3 at another time at a second cylinder (perhaps on a different apparatus). In the offline process, it is not unusual for stretch and/or slip errors to typically be in the same direction. Consequently, the error between the proper positioning of the tool (e.g., one of the cylinders) and the print on the web 5 accumulates continuously. In general, register techniques used for the previously discussed inline process cannot hold register in the same range or at all if the position error increment is too high. To eliminate this difficulty, the offline registration technique applies additional registration routines such as, for example, accumulating or trending registration routines. Accumulating registration routines include filtering the accumulated error and making speed adjustments to achieve the same speed for the web and the tool.

Figure 7:
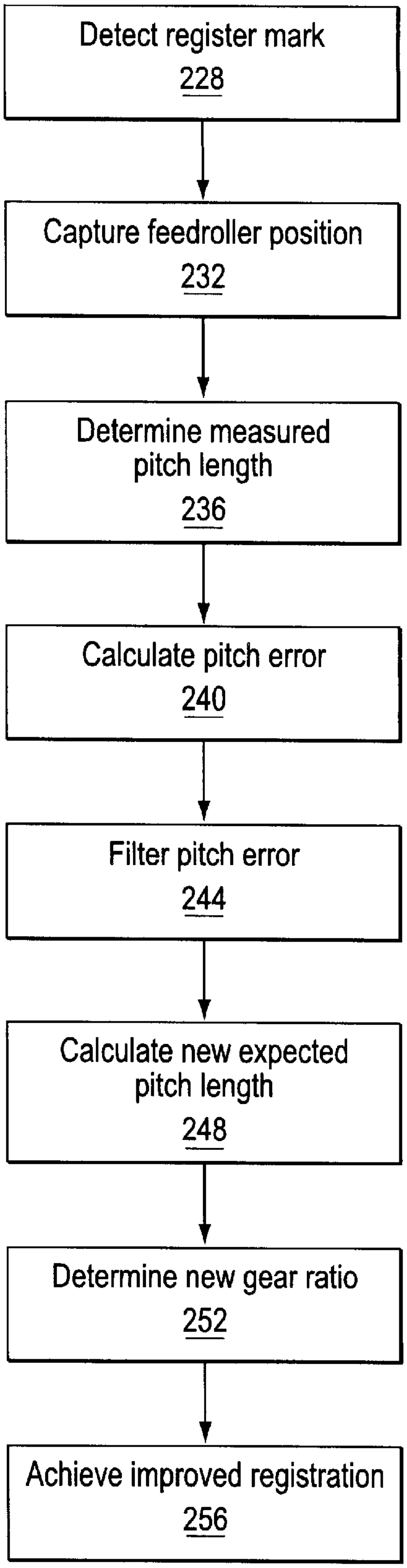
FIG. 7 is a flowchart illustrating an accumulating registration routine according to the present invention.

FIG. 7 illustrates the accumulating registration routine according to the present invention. Accumulating registration maintains the gear ratio between the stamping cylinder 10 and the feeding shaft for the foil 3 to achieve the proper foil speed. The routine continuously compares the measured pitch length (i.e., the distance between two register marks) to the expected pitch length.

In step 228, the register mark sensor 188 detects the register mark. The sensing for the register mark triggers, in step 232, the feedroller position feedback arrangement 186 of the servo motor module 182 to capture the position of the feedroller 42*a* and to transmit the captured position information to the control system 104 via the feedroller position interface 152. In step 236, the control unit 108 determines a measured pitch length Pm by comparing the captured position with the previously captured position. In step 240, the control unit 108 calculates a pitch error Ri as the difference between the measured pitch length Pm and the expected pitch length Li or, alternatively, the difference between a captured position Pcf of the feedroller 42*a* and the expected position Ptf of the feedroller 42*a*. The pitch error Ri is filtered in step 244 by the control unit 108 to smooth out high fluctuations in pitch error Ri so as to reduce the chance of over compensating. The filtered pitch error is then added to the expected pitch length Li to determine a new expected pitch length Linew in step 248. The control unit 108, in step 252, determines a new gear ratio Rf as the ratio of the new expected pitch length Linew and the distance Lc between two stamps on the web 5 and stores the new gear ratio Rf in the gear ratio module 124. In step 256, using the new gear ratio Rf, the control system 104 reduces the pitch error Ri in achieving improved registration.

In step 244, the pitch error is filtered by the control unit 108 to smooth out high fluctuations in the pitch error Ri so that the control system 104 does not over compensate. In one embodiment of the process, the pitch error Ri is accumulated and averaged over, for example, the last ten cycles (i.e., a running average Riavg). Furthermore, in an effort to further reduce the effect of high fluctuations, the running average Riavg is multiplied by a factor less than 1 (e.g., 16 percent). The product of the factor and the running average Riavg added to the expected pitch length Li equals the new expected pitch length Linew (i.e., Linew=Li+0.16 * Riavg).

The pitch error may be further filtered via windowing. A window size Pw may be defined around the target position Pt in which only those registration remarks which fall within the window are considered for registration purposes. Thus, outlying or spurious registration marks are eliminated from the above described calculations. In one embodiment, the window is defined as Pt±Pw. The front end of the window Wenb (i.e., Wenb=Pt−Pw) is a position in which the control system 104 is enabled to receive a sensed registration mark. The back end of the window Wdis (i.e., Wdis=Pt+Pw) is a position in which the control system 104 is disabled from receiving the sensed registration mark. A new target position for pitch length Ptfnew is the sum of the previous target position Pt and the pitch target position increment Li (e.g., the holographic image repeat).

Windowing also finds application in the phasing registration routine of the online process. Windowing for the online process is the same for the offline process except that a new target position for the stamping cylinder 10 is a sum of the previous target position Pt and the stamping cylinder target position increment Lc for stamping cycle.

Finally, to eliminate rounding, fraction and foll-over problems the system according to the present invention uses a scale of 1. This is accomplished by transforming all variables into encoder counts.

In the foregoing description, the method and the system according to the present invention have been described with reference to specific embodiments and examples. It is to be understood and expected that variations in the principles of the method and the system herein disclosed may be made by one skilled in the art and that it is intended that such modifications, changes, and substitutions fall within the scope of the present invention as set forth in the appended claims. The specification and the drawings are accordingly to be regarded in an illustrative sense, rather than in a restrictive sense.

What is claimed is:

1. A method for efficiently using media that can be stamped on a substrate, comprising the steps of:

providing the media with a first velocity component from a feedroller;

providing the media with a second velocity component that is a function of a velocity of a shuttle, the shuttle moving linearly with the velocity being variable and periodic;

urging the media against a substrate, the media and the substrate having same velocity, during the urging, in a stamping area of a cylinder with at least one die, the substrate having a greater average velocity than an average velocity of the media; and maintaining a registration between the media and the substrate via a control arrangement by detecting a position of at least one of at least one registration mark on the media, the feedroller and the cylinder and by modifying a gear ratio to reduce errors in the registration based upon the detected position, the gear ratio representing a ratio between a cycle on the media and a cycle on the substrate, wherein the step of maintaining the registration includes the steps of calculating a pitch error, filtering the pitch error, calculating a new expected pitch length and determining a new gear ratio.

2. The method according to claim 1, wherein the step of calculating the pitch error includes the steps of detecting at least one of the at least one registration mark, capturing the position of the feedroller and determining a measured pitch length.

3. The method according to claim 1, wherein the step of filtering the pitch error includes the step of calculating a running average of the pitch error.

4. The method according to claim 3, wherein the step of filtering the pitch error includes the step of reducing the running average by multiplying the running average by a factor that is less than one.

5. The method according to claim 1, wherein the step of maintaining the registration includes the step of ignoring the detected position if the detected position does not fall inside a window defined around a target position.

6. The method according to claim 1, wherein the step of maintaining the registration includes the step of maintaining the registration in an offline process.

7. A method of maintaining a registration between a media and a substrate in a system for efficiently using the media that can be stamped on the substrate, the system including a feedroller coupled to the media, the feedroller providing the media with a first velocity component, a shuttle coupled to the feedroller via the media, the shuttle moving linearly with a variable periodic velocity, the shuttle providing the media with a second velocity component, the second velocity component being a function of the velocity of the shuttle, a cylinder having at least one die, the cylinder having a stamping area in which one of the at least one die urges the media against the substrate, the media and the substrate having same velocity in the stamping area during the urging, the substrate having a greater average velocity than an average velocity of the media, the method comprising the steps of:

detecting a position of at least one of at least one registration mark on the media, a feedroller and a cylinder;

calculating a pitch error;

filtering the calculated pitch error;

calculating a new expected pitch length as a function of the filtered calculated pitch error;

determining a new gear ratio as a function of the calculated new expected pitch length; and modifying a gear ratio to reduce errors in the registration based upon the detected position, the gear ratio representing a ratio between a cycle on the media and a cycle on the substrate.

8. A method of maintaining a registration between a media and a substrate in a system for efficiently using the media that can be stamped on the substrate, the system including a feedroller coupled to the media, the feedroller providing the media with a first velocity component, a shuttle coupled to the feedroller via the media, the shuttle moving linearly with a variable periodic velocity, the shuttle providing the media with a second velocity component, the second velocity component being a function of the velocity of the shuttle, a cylinder having at least one die, the cylinder having a stamping area in which one of the at least one die urges the media against the substrate, the media and the substrate having same velocity in the stamping area during the urging, the substrate having a greater average velocity than an average velocity of the media, the method comprising the steps of:

detecting a position of at least one of at least one registration mark on the media, a feedroller and a cylinder;

modifying a gear ratio to reduce errors in the registration based upon the detected position, the gear ratio representing a ratio between a cycle on the media and a cycle on the substrate;

detecting one of the at least one die on the cylinder with a sensor, the sensor near the cylinder at a first angle from the stamping area;

calculating a second angle swept out by the cylinder during a stamping cycle; and automatically setting the cylinder at a position that is a function of the first angle and the second angle.

* * * * *